(12) United States Patent
Ten Kate et al.

(10) Patent No.: US 10,852,435 B2
(45) Date of Patent: Dec. 1, 2020

(54) OCCUPANCY SENSING SYSTEM AND SENSING METHOD

(71) Applicant: KONINKLIJKE PHILIPS N.V., Eindhoven (NL)

(72) Inventors: Warner Rudolph Theophile Ten Kate, Waalre (NL); Murtaza Bulut, Eindhoven (NL); Kars-Michiel Hubert Lenssen, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 83 days.

(21) Appl. No.: 16/070,168

(22) PCT Filed: Jan. 19, 2017

(86) PCT No.: PCT/EP2017/051116
§ 371 (c)(1),
(2) Date: Jul. 13, 2018

(87) PCT Pub. No.: WO2017/125512
PCT Pub. Date: Jul. 27, 2017

(65) Prior Publication Data
US 2019/0033458 A1 Jan. 31, 2019

(30) Foreign Application Priority Data
Jan. 20, 2016 (EP) .................... 16151984

(51) Int. Cl.
*G01S 17/66* (2006.01)
*G08B 13/191* (2006.01)
(Continued)

(52) U.S. Cl.
CPC .............. *G01S 17/66* (2013.01); *G01S 17/04* (2020.01); *G08B 13/191* (2013.01); *G08B 21/0469* (2013.01); *G01S 17/87* (2013.01)

(58) Field of Classification Search
CPC ..... G01S 17/026; G01S 17/66; G08B 13/191; G08B 21/0469
(Continued)

(56) References Cited

U.S. PATENT DOCUMENTS 6,836,714 B1 * 12/2004 Nitschke ................. B60R 21/01
280/734
7,148,974 B1 * 12/2006 Schmitt ................... G01S 17/66
356/622
(Continued)

FOREIGN PATENT DOCUMENTS

CN 103298156 A 9/2013
EP 0908854 A2 4/1999
(Continued)

OTHER PUBLICATIONS

Yavari, et al., "System-on-Chip Based Doppler Radar Occupancy Sensor", 33rd Annual International Conference of the IEEE EMBS, Aug. 30-Sep. 3, 2011, Boston, MA, pp. 1913-1916.
(Continued)

*Primary Examiner* — Sunghee Y Gray

(57) ABSTRACT

An occupancy detection system uses at least two sensors which are mounted spaced apart in an area to be monitored. A test metric is formed which based on a combination of distances for the at least two sensors. The evolution of the test metric over time enables determination of whether there is a single occupant or multiple occupants in the area to be monitored.

17 Claims, 3 Drawing Sheets

(51) Int. Cl.
*G01S 17/04* (2020.01)
*G08B 21/04* (2006.01)
*G01S 17/87* (2020.01)

(58) Field of Classification Search
USPC .................................................. 356/614–625
See application file for complete search history.

(56) References Cited

U.S. PATENT DOCUMENTS

| 2005/0282174 | A1* | 12/2005 | Webb ..................... | G16B 25/00 |
| | | | | 435/6.11 |
| 2010/0317366 | A1* | 12/2010 | Shen ..................... | G01S 5/0252 |
| | | | | 455/456.1 |
| 2010/0321184 | A1 | 12/2010 | Dreuillet et al. | |
| 2012/0314081 | A1 | 12/2012 | Kleihorst et al. | |
| 2013/0107245 | A1 | 5/2013 | Covaro | |
| 2014/0226167 | A1* | 8/2014 | Smith ..................... | G03B 21/14 |
| | | | | 356/614 |
| 2014/0333468 | A1* | 11/2014 | Zhu ........................ | G01S 19/11 |
| | | | | 342/54 |
| 2016/0258642 | A1* | 9/2016 | Cheatham, III ....... | G05B 15/02 |
| 2016/0377718 | A1* | 12/2016 | Tanaka .................. | G01S 17/026 |
| | | | | 250/221 |
| 2017/0059708 | A1* | 3/2017 | Fitzgibbon ............ | G01S 17/003 |
| 2017/0236421 | A1* | 8/2017 | Yang ...................... | B60W 30/08 |
| | | | | 701/301 |
| 2018/0131449 | A1* | 5/2018 | Kare ...................... | G01S 17/026 |
| 2018/0199214 | A1* | 7/2018 | Shen ...................... | H04W 24/02 |
| 2018/0364717 | A1* | 12/2018 | Douillard .............. | G01S 17/023 |
| 2019/0120963 | A1* | 4/2019 | Korkalo ................ | H04N 13/246 |
| 2019/0128673 | A1* | 5/2019 | Faragher ................ | G01C 21/16 |

FOREIGN PATENT DOCUMENTS

| JP | 2012103196 A | 5/2012 |
| WO | 2009090598 A1 | 7/2009 |
| WO | 2011110268 A1 | 9/2011 |
| WO | 2015068909 A1 | 5/2015 |

OTHER PUBLICATIONS

Lukac, et al., "Contactless Recognition of Respiration Phases Using Web Camera", 2014 24th International Conference Radioelektronika, IEEE, Apr. 15, 2014, pp. 1-4.

* cited by examiner

OCCUPANCY SENSING SYSTEM AND SENSING METHOD

FIELD OF THE INVENTION

This invention relates to an occupancy sensing system, in particular for distinguishing between individual occupants in a space and multiple occupants in the space.

This application is the U.S. National Phase application under 35 U.S.C. § 371 of International Application No. PCT/EP2017/051116, filed on Jan. 19, 2017, which claims the benefit of European Application Serial No. 16151984.8, filed Jan. 20, 2016. These applications are hereby incorporated by reference herein.

BACKGROUND OF THE INVENTION

Functional assessment or monitoring of a person's health status, physical abilities, mental abilities, or recuperation after injury, hospitalization and treatment is of primary concern in most branches of medicine, including geriatrics, rehabilitation and physical therapy, neurology and orthopedics, nursing and elder care.

Investigations have found that an individual's functional ability is actually environment-specific, since function increases when persons are in familiar surroundings due to reduced confusion. Also, one-time assessment of function does not allow for assessment of variability of functional performance over the course of a day or several days, nor does it allow for assessment of change which is important in determining the adequacy of certain clinical services and treatments (such as rehabilitation) following functional loss.

A consensus therefore exists that it is preferable to assess or monitor independent functioning of a person at their home or within familiar surroundings.

A level of independent function is commonly indicated by the quality in which Activities of Daily Living (ADLs) are performed. ADLs refer to the most common activities that people perform during a day. Therefore, a reduced quality in the ADLs can be an indicator for care needed. For example, an anomaly in the regular performance of one or more ADLs can serve as warning for special attention.

Devices and systems have been developed to monitor the ADLs of individuals as they live independently in their own home or within familiar surroundings. For example, one such known system for detecting activities of daily living of a person system comprises three main components: (i) a sensor system that collects information about the person's activities and behaviors; (ii) an intelligence (or information processing) system that interprets the sensor signals for determination of ADL behavior; and (iii) a user interface system that enables care givers to inspect the interpreted (processed) information. The intelligence system typically makes use of computational techniques known in the art as artificial intelligence. The system may be supported by conventional technologies for data collection, transmission, and storage.

Typically, these patterns of activity are displayed in a dashboard type of environment. The purpose of the system is to verify everything is going well, or in case of an alarm, to get a first impression what was going on before and up to the incident which triggered the alarm.

This monitoring approach enables the provision of remote care, which in turn enable people in need of that care to continue living in their own homes without the need to transfer to a care facility.

One of the problems in such monitoring systems is to distinguish the activities of interest (i.e. those by the care recipient) from those by other people present in the house. When the persons are present in different rooms, this problem can be solved by determining in which room the person of interest is. The fact that multiple persons are present might be known, and the system only has to identify in which room the care recipient resides.

If it is not known whether or not there are multiple persons present, a detection system is needed. Such detection systems can be based on testing the simultaneous presence in different rooms. This detection system fails, however, when the multiple people are present in a same room.

There is therefore a need for a way to detect the presence of multiple people in the same room with simple hardware and using a simple method with limited signal processing. This will then enable more reliable distinction to be made between the activities of interest (i.e. those by the care recipient) from those by other people present.

SUMMARY OF THE INVENTION

The aforementioned need is addressed with the invention as defined by the independent claims. The dependent claims provide advantageous embodiments.

According to examples in accordance with an aspect of the invention, there is provided an occupancy detection system, comprising:
  an input for receiving sensor outputs from at least two sensors mounted spaced apart in and/or near an area, each sensor being configured, when in a static mode, for generating a sensor signal which is dependent on the distance of a sensed subject present in the area to a sensor, or on the distances of multiple sensed subjects present in the area to a sensor and for generating a sensor output based on the sensor signal; and
  a processor for processing the received sensor outputs.
The processor is adapted (configured) to:
  derive a test metric based on a combination of the sensor outputs, which test metric represents a combination of distances; and
  determine from the evolution of the test metric over time whether there is a single subject or multiple subjects in the area.

The detection of the presence of (preferably living) subjects (e.g. users or occupants of the area such as people or pets) in that area is achieved using multiple sensors mounted in and/or near the area. The sensors have different positions in and/or near the area such that each sensor generates sensor signals with distance data of one or more subjects towards each sensor.

The sensors are each in a static, or stationary mode (or state) such that they have a static field of view covering an area of interest in which the occupancy detection is to be carried out. The sensors thus have a wide field of view. This means the system is simple to implement without requiring complex sensor types. For the purpose of the present invention, "static mode" means that the time behavior of the input-output function of the sensors does not change over time, or does not change significantly over time; in other words, a "static mode" implies the same output for movement by the same object or subject at same place.

In an embodiment, such sensors may be static sensors, which are consequently continuously in a static mode. Alternatively, rotatable or movable sensors which adopt, from time to time, a static mode for the purpose of carrying out the detection in accordance with the present invention are also herein foreseen.

In an embodiment according to the invention, an occupancy detection system is provided, said system comprising: i) an input for receiving sensor outputs from at least two static sensors mounted spaced apart in and/or near an area, each static sensor being configured for generating a sensor signal which is dependent on the distance of a sensed subject present in the area to a sensor, or on the distances to multiple sensed subjects present in the area to a sensor and for generating a sensor output based on the sensor signal; ii) a processor for processing the received sensor outputs, wherein the processor is adapted to: a) derive a test metric based on a combination of the sensor outputs, which test metric represents a combination of distances; and b) determine from the evolution of the test metric over time whether there is a single subject or multiple subjects present in the area.

Each sensor outputs a sensor signal in the form of a sensor output and this is transmitted to the input of the system such that it can be processed by a processor. The sensor signal is transmitted either directly as is (e.g. raw data), or in transformed or converted shape (partial processing to e.g. distance data). The system operates by combining the outputs from the different sensors and monitoring a test metric, which is a combination of the sensor outputs, over time. The evolution of the test metric over time may be considered to comprise a test against a (null) hypothesis that a single subject is present in the area. When a single subject is present, the test metric varies in a first predictable way, whereas the test metric varies in a different way when multiple subjects are present. A time series of the test metric is for example stored and analyzed to enable analysis of the evolution of the test metric over time.

Each sensor signal may be converted into a corresponding distance metric and the test metric is then a combination of the distance metrics.

Each sensor may comprise a passive infrared (PIR) sensor. This enables the system to have low power consumption, for example suitable for battery operation. The signal detected by the sensor is then a function of the proximity of a radiating or reflecting body. If there are multiple such bodies, the sensed signal relates to the combination of these reflections or emissions.

The processor may be adapted to obtain a distance metric from the inverse of each sensor signal intensity, for example the square root of the inverse of the sensor signal intensity. In the case of a PIR sensor, the detected signal for a given radiation or reflection from a body decreases with the square of distance. As a result, by obtaining the square root of the inverse of the sensor signal, a metric proportional to distance is obtained. For a single subject, it relates to the distance of the sensor to that subject. For multiple subjects, it represents a combination of the distances.

The test metric may comprise a combination of the distance metrics, for example a sum of the distance metrics. For a single subject spaced between two sensors, the sum remains constant as the subject moves along a line between the two sensors, and caries in a known way for movement away from this line. When multiple subjects are present in the area the sum will reveal more variation over time.

The processor may be adapted to set a threshold for the variation in the test metric from a baseline level, wherein a deviation of the test metric beyond the threshold is indicative of multiple subjects present in the area. The threshold may for example comprise a sum of predetermined number of standard deviations of the test metric for a single subject present in the area, for example two or four standard deviations. In this way, the effect of the room geometry on the expected test metric variation may be learned based on data gathered for a single subject present in the area. The threshold may be applied over a particular time window.

The system may be further adapted to:
determine breathing from the sensor signals, and thereby detect single or multiple breathing frequencies; and/or
determine total thermal radiation levels from the sensor signals, and thereby detect single or multiple subjects present in the area.

The determinations of breathing and/or thermal radiation levels can be done by the sensors having a dedicated processing unit, but can also be done by the processor. In the first case, the processor can just use the corresponding determined breathing rates and/or total radiation levels as output by the sensors and received by the input and therewith processor.

By detecting breathing, individual or multiple breathing patterns can be identified. The total thermal radiation levels may be used to detect individual or multiple subjects, particularly when there are sudden jumps in radiation level, corresponding to subjects entering or leaving an area.

The system or processor can be adapted to compare breathing rates to each other or reference rates to distinguish whether they stem from humans or other living beings such as animals (pets). The reference data can be prerecorded or can be determined during calibration periods where only humans or only the animals are present. The number of humans and animals can be determined in this way.

The sensors need not be part of the system perse. Hence a system according to the invention can be provided without the sensors and make use of existing sensors (e.g. already provided in and/or near the area for other initial purposes). Thus the system may be applied to process the sensor outputs from existing sensors that are not part of the system.

Alternatively, the system may further comprise said at least two sensors for mounting spaced apart in the area to be monitored. Furthermore, the processing may be divided between the sensors themselves and the processor. For example the sensors may locally convert their sensor signal into the distance metric for sensor output, whereas the central processor may combine the distance metrics.

Examples in accordance with another aspect of the invention provide a method of detecting the presence of one or more subjects in an area, comprising:
receiving sensor outputs from at least two sensors (10,12) mounted spaced apart in and/or near an area, each sensor being configured, when in a static mode, for generating a sensor signal which is dependent on the distance of a sensed subject present in the area to a sensor, or on the distances to multiple sensed subjects present in the area to a sensor and for generating a sensor output based on the sensor signal
processing the sensor outputs to:
derive a test metric based on a combination of the sensor outputs, which test metric represents a combination of distances; and
determine from the evolution of the test metric over time whether there is a single subject or whether there are multiple subjects in the area.

Each sensor may comprise a PIR sensor or other passive radiation sensor.

The method may comprise obtaining a distance metric from the inverse of each sensor signal intensity, for example the square root of the inverse of the sensor signal intensity.

This is appropriate for a sensor which measure radiation levels, which follow an inverse square function with respect to distance. The test metric may then comprise a combination, such as a sum, of the distance metrics.

A threshold may be set for the variation in the test metric from a baseline level, wherein a deviation of the test metric beyond the threshold is indicative of multiple occupants.

When thermal radiation levels are determined, this is preferably done using the same sensors. Preferably such sensors are then IR or passive IR sensors as these already determine thermal radiation.

The processing used in the method may be implemented by a computer program or computer program product.

For the invention, an area can be a space within a building, transportation device such as boat, aircraft, car or other. The area can be a room. The area can be an open area or an area enclosed by walls such as a room. Preferably the area is a room in a living environment for example of an elderly person or other person that needs monitoring.

The subject to be monitored preferably is a living subject such as a person or animal (pet). The person can be an elderly person or any other person that needs monitoring over time.

BRIEF DESCRIPTION OF THE DRAWINGS

Examples of the invention will now be described in detail with reference to the accompanying schematic drawings, in which.

DETAILED DESCRIPTION OF THE EMBODIMENTS

The invention provides an occupancy detection system (also called presence detection system) in which at least two sensors are mounted spaced apart in and/or near an area to be monitored. A test metric is formed which is based on a combination of distances for the at least two sensors. The evolution of the test metric over time enables determination of whether there is a single occupant or multiple occupants in the area to be monitored.

The two or more sensors monitor the same area space, but from different positions or from different sides. Each sensor has a field of view which covers the area of interest. It is already known that the ratio of intensities between two such sensor signals provides an indication of the location of an object, relative to the locations of the two sensors. For a radiation sensor such as a passive infrared (PIR) sensor, the received intensity is, in first order, inversely proportional to the square of the distance of the infrared radiating object (emitter) to the sensor. When the radiating object moves closer to one sensor, and more distant from the other, the received intensity increases at the first sensor and decreases at the other.

Figure 1:
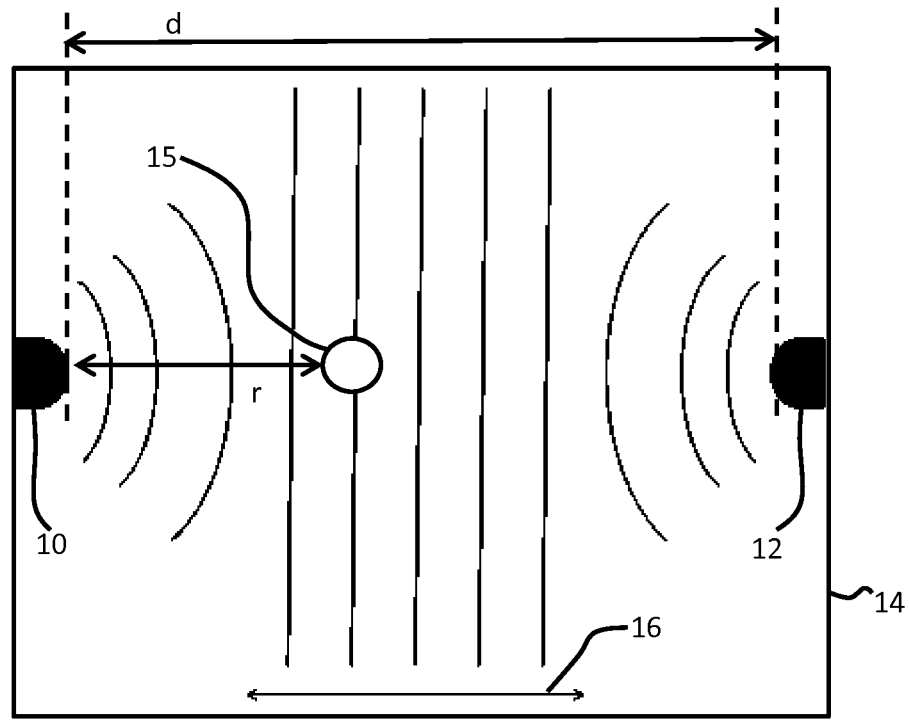
FIG. 1 shows two sensors on opposite sides of a space being monitored.

FIG. 1 shows two sensors 10, 12 on opposite sides of a space 14 being monitored. Each sensor has a field of view which substantially covers the space 14. The angle of the field of view is for example more 80 degrees or more (for example a sensor with a near 90 degree field of view may be mounted in the corner of a space), and the field of view may be more than 150 degrees (for example a sensor with a near 180 degree field of view may be mounted at a side wall of a space). Each sensor provides a single (one dimensional) signal value relating to the detection in the space, in particular an intensity level. Combination of the two sensor signals enables the location of an occupant 15 to be determined in one dimension. In other words the position along the direction extending between the two sensors (i.e. parallel to the axis 16) can be determined.

For example, by taking a ratio between the sensor signal outputs in known manner, the general level of signal emitted is cancelled. For example, if the ratio is 1, this will indicate that the subject (i.e. a person) is in the middle between the two sensors. This does not give a unique position for the person; instead the person may be somewhere along a line perpendicular to the axis 16. For a PIR sensor with an inverse square signal intensity relationship, if the ratio is 4, this will indicate that distance to the closest sensor is X, while distance to the further sensor is 2X. In this case, the person may be somewhere along a curve.

In general, if the ratio is Y, the distance to the closest sensor is X, and distance to the further sensor is $X*\sqrt{Y}$. Using this, and the prior knowledge of the distance between the two sensors, the user can be accurately located in one dimensional space, and can be located as somewhere along a path in two dimensional space.

Figure 2:
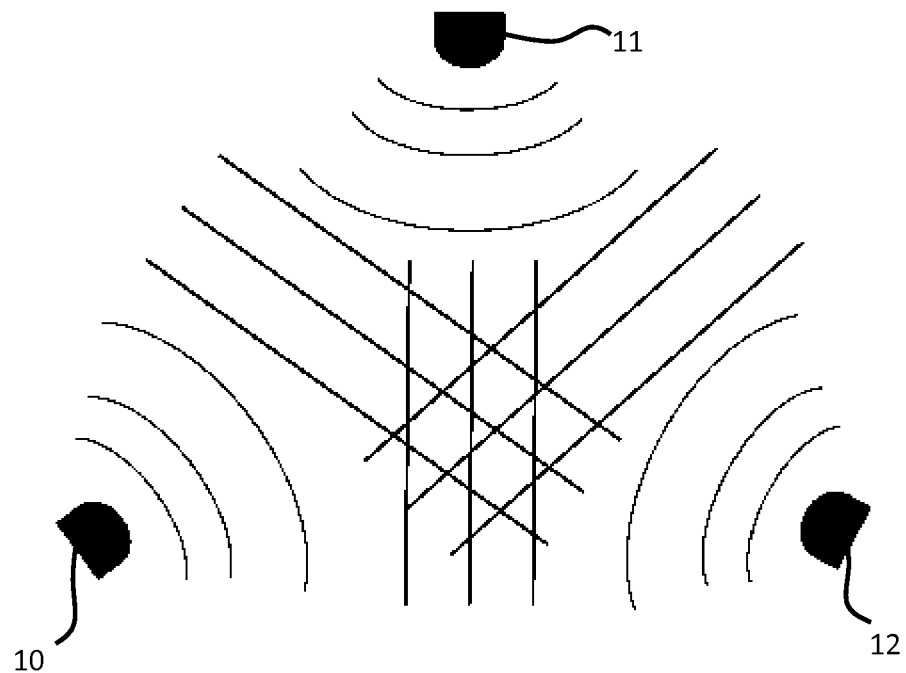
FIG. 2 shows three sensors for a space being monitored.

With three sensors 10, 11, 12 as shown in FIG. 2, the location in two dimensions can be determined, using the same principle. The location is then at the intersection of the three paired one-dimensional solutions.

Figure 3:
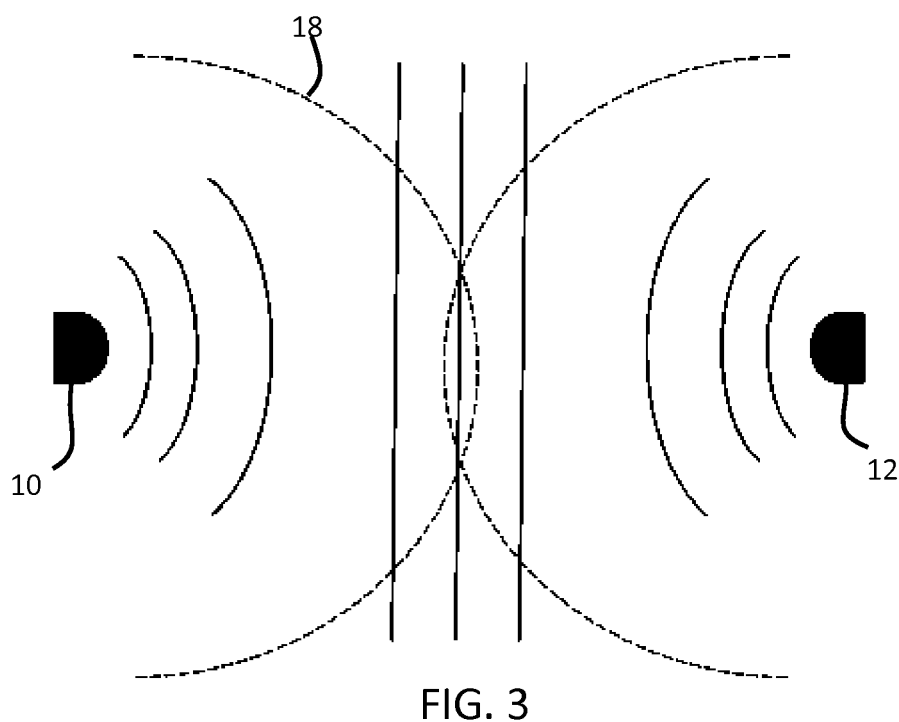
FIG. 3 shows how calibration enables a distance from each sensor to be determined.

Instead of (or as well as) using the ratio of the intensities of the signals from the sensors, a weighting may be applied to the sensor signals. This provides a form of sensor calibration. For such a calibrated sensor, the distance from each individual sensor can be determined. This distance defines the radius of a circle 18 as shown in FIG. 3 (or sphere if considering a 3D volume) around the location of the sensor. If the sum of the determined radii for two sensors is smaller than the distance d between the sensors, the presence of a second person is detected. The calibration also enables the two possible specific locations to be identified along the vertical axes (perpendicular to axis 16): for example the intersection of circles 18 or the intersection of a circle and the dividing line perpendicular to the direction vector 16.

By using at least three sensors, the intersection of three circles should coincide in the case of a single person present, otherwise the presence of additional persons is detected.

Note that the above explanation is based on first order modeling. In reality there will be room reflections and inhomogeneous radiation patterns. That will make the system less robust. Also, if a calibration is required by the system, it has to be performed for the particular user in the particular home or area of sensing. Thus, it would be desirable to avoid the need for calibration.

An example will now be provided of how two (or more) sensors may be used to determine the presence of a single or multiple occupants and without requiring accurate location information to be determined from each sensor signal or indeed from the combination of sensor signals. The approach is based on the observation over time of a metric in order to simplify or avoid the calibration operation, and to make the system more robust, for example less sensitive to room fluctuations.

For the purposes of explanation, the sensors may be denoted as a left sensor 10 (subscript L) and a right sensor 12 (subscript R). Of course, this is entirely arbitrary, and all that is required is that the sensors are mounted spaced apart, with the occupants at least partly between the sensor positions (they need to be in the field of sensing of the sensors).

For explanation it is assumed that the sensors have identical responses. If not, this imbalance can be modeled as a shift in the determined location of the person. However, the invention is not concerned with accurate location but is only concerned with the discrimination between single and multiple occupants. This enables the system to be robust and avoids the need for accurate calibration. For a single person in the area being monitored, the sensors will provide output intensities:

$$I_L = I_0/r^2$$

$$I_R = I_0/(d-r)^2$$

where $I_L$, $I_R$ are the signal intensities measured by the left (L) and right (R) sensors, respectively. $I_0$ is a reference intensity (for example at a distance 1 m), r is the distance from the left sensor, and d is the distance between the sensors (hence, (d−r) is the distance from the right sensor). The distances d and r are shown in FIG. 1.

It follows that:

$$I_L/I_R = ((d-r)/r)^2$$

so that:

$$r = d/(1+\sqrt{(I_L/I_R)}) \quad \text{(Eq. 1)}$$

Thus, the location can be estimated from the ratio of intensities, namely $I_L/I_R$. This is a known approach as explained above.

This ratio could be used as a test metric, which is then observed over time. However, a non-constant value would result over time, even in the case of a single occupant present.

Instead, a test metric can be selected based on the sum of the square roots of the intensities:

$$T1 = \sqrt{(I_L)} + \sqrt{(I_R)} = \sqrt{(I_0)} \cdot (1/r + 1/(d-r))$$

This gives:

$$T1 = \sqrt{(I_0)} \cdot d/(r(d-r)) \quad \text{(Eq. 2)}$$

where T1 is the test metric. This test metric is again not constant over time even in case of a single person present.

Substituting the above expression for r (Eq. 1) leads to:

$$r(d-r) = d/(1+\sqrt{(I_L/I_R)}) * d/(1+\sqrt{(I_R/I_L)})$$
$$= d^2/(2 + \sqrt{(I_L/I_R)} + \sqrt{(I_R/I_L)})$$

This gives:

$$T1 = \sqrt{(I_0)}(2+\sqrt{(I_L/I_R)}+\sqrt{(I_R/I_L)})/d$$

Thus, the metric T1 may be expressed based on the ratio of the sensor signals. As mentioned above, this test metric is not constant with actual location r.

A preferred test metric, and one which forms one example for use in the system and method of the invention, is the sum of the square root of the inverse intensities, so that the test metric relates to distances:

$$T2 = 1/\sqrt{(I_L)} + 1/\sqrt{(I_R)}$$

This test metric may be extended to three or more sensor signals by summing the inverse square root signals for those additional sensors.

When a single person is present in the room, the test metric evolves as:

$$T2 = 1/\sqrt{(I_L)} + 1/\sqrt{(I_R)} = r/\sqrt{(I_0)} + (d-r)/\sqrt{(I_0)} = d/\sqrt{(I_0)}$$

Put another way, T2 is proportional to the distance to left sensor+distance to right sensor. For a person along the line between the two sensors, this corresponds to r+(d−r)=d.

In this way, the test metric is based on a combination of the sensor signals for the at least two sensors, and the test metric represents a combination of distances.

For a person in other locations in two dimensional space, the test metric T2 will increase when there is movement away from the line directly between the two sensors.

Preferably, the sensors are calibrated, so they have identical values of $I_0$. However, without calibration a position error results and the term in r does not cancel. However, the test metric T2 will have only a small variation over time in the case of a single person, whereas it will have much greater variation over time in the case of multiple people. All well as the dependency on the actual value of $I_0$, there is also a dependency on the value of d. Both are assumed constant over time (to the first order), and that property is used to circumvent the need for calibration. Thus, a calibration may be avoided by monitoring the evolution of the test metric over time.

It is also noted that since people do not radiate homogeneously, the terms $I_0$ are also not constant, and for example change when the people turn around. The system can be enhanced to learn these factors, i.e. by calibrating using earlier, actual data when in usage rather than calibration data from a dedicated calibration procedure. In this way, calibration is simplified at least from the user point of view. This learning is to derive information about the factors to apply to the two signals so that T2 stays constant (or minimize variations in T2).

For movement in two dimensions, the test variable T2 will vary. However, it will vary in known manner and within boundaries which are dependent on the dimensions of the space.

To model movement in two dimensional space, the distance to the left sensor becomes $r/\cos(\varphi_L)$ and the distance to the right sensor becomes $(d-r)/\cos(\varphi_R)$, where r and d−r remain defined as the distances to the sensors, when the person position is projected perpendicularly onto the line extending between the two sensors. The angles $\varphi_L$ and $\varphi_R$ are the angles between the line connecting the sensor and the person location and the line between the two sensors.

This $\cos(\varphi)$ dependency can be incorporated into a more sophisticated model than the one described above. If a person moves along a line perpendicular to the line between the sensors, both sensors will receive a decreased signal (or increased, depending on the location and direction of movement). When instead moving in the direction of the line, one sensor signal will increase, the other will decrease.

A first, simple compensation can be as follows. Suppose both $I_L$ and $I_R$ decrease in strength. Then, both $I_L$ and $I_R$ are multiplied by an amount β, such that one of them returns to its original value (and the other still decreases). In other words in the sum of distance r and distance (d−r), both are not allowed to decrease or increase. If that happens, the values are scaled such that one of them keeps its original value. This means the test metric (which is then the sum based on the scaled values) remains substantially constant. This approach essentially involves both a scaling and a summation. However, the test metric remains a representation of a combination of distances, but in this case the distances are effectively scaled before the combination. The distances are approximately scaled back to distances as projected on the vector line 16.

When two occupants are present in the room, the respective intensities sum:

$$I_L = I_0/r_0^2 + I_1/r_1^2$$

$$I_R = I_0/(d-r_0)^2 + I_1/(d-r_1)^2$$

where:
$r_0$=distance of person 0 to the left sensor;
$r_1$=distance of person 1 to the left sensor;
$I_0$=intensity of radiation from person 0;
$I_1$=intensity of radiation from person 1;
d=distance between sensors.

It can be assumed that $I_0=I_1$ to simplify the expressions, and thus only $I_0$ is used below. Then, the test metric T2 (for the example of the simple text metric explained above, without rescaling to compensated for $\cos(\varphi)$) becomes:

$$T2 = 1/\sqrt{(I_L)} + 1/\sqrt{(I_R)}$$

$$= ((r_0 * r_1)/\sqrt{\{I_0(r_0^2 + r_1^2)\}}) + ((d-r_0)*(d-r_1))/$$

$$\sqrt{\{I_0((d-r_0)^2 + (d-r_1)^2)\}}$$

Different cases can be considered. In a first case, $r_0=r_1$. This means the two occupants are moving together towards or away from the left sensor. In this case:

$$T2 = d/(\sqrt{2} * \sqrt{I_0})$$

In a second case, $r_0=\varepsilon$, $r1=d-\varepsilon$, where $\varepsilon$ is close to 0. This means d>>$\varepsilon$, so that in the equation for T2 terms in d are dominant over terms in $\varepsilon$. In this scenario, person 0 has moved to the left sensor and person 1 has moved to the right sensor. In this case, using the assumption d>>$\varepsilon$, the test parameter simplifies to:

$$T2 \sim r_0/\sqrt{I_0} + d - r_1/\sqrt{I_0} = 2*\varepsilon/\sqrt{I_0}$$

Thus, it can be seen that the test metric value depends strongly on the position of the two occupants, being proportional to the shortest distance $\varepsilon$ to each sensor (which in this case is the same distance). For the more general scenario of two occupants moving freely, there is again a dependency on the shortest distance from each sensor to one of the multiple occupants.

In a third case, $r_0=\varepsilon$, $r_1=\varepsilon$, where $\varepsilon$ is close to 0. This is a special form of the first case in which both occupants are close to one sensor. Then:

$$T2 = d/(\sqrt{2} * \sqrt{I_0})$$

The three cases above show that the test metric T2 only shows small variations over time when the two persons move side-by-side. If they move in different ways, the test metric will change value much more than occurs for a single person, becoming smaller in value. This corresponds to the overall intensity becoming larger. The value $I_0$ is constant (as is the value d) so it can be ignored when it is changes in the value of the test metric which are monitored.

By testing the variation over time of the test metric T2, it can be determined whether or not multiple occupants are present in the room. Small variations over time of the test metric (or the modified test metric as explained above to reduce the effect of the angle $\varphi$) are indicative of a single person. Larger variations over time and/or more rapid variations over time are indicative of multiple persons.

To take account of the variation in the test metric which is expected even for a single occupant, a threshold can be set for allowable changes in the test metric from a baseline. The baseline is then an average value for periods when one occupant is identified, and the threshold may be a set number of standard deviations for the data set observed for a single occupant. For example, beyond two standard deviations, it may be concluded that there are multiple occupants.

The data set for a single person present in the room may be obtained by training, for example by having a single occupant walk all around the room during a calibration procedure. Alternatively, the system may learn from the initial data collected over time. Once a sufficient data set has been obtained, even if there are periods with one occupant and periods with multiple occupants, the different conditions may then be distinguished at a later time, and the suitable thresholds set. This essentially involves using live data as a calibration data set during an iterative learning process.

As mentioned above, weight factors may be derived for the two sensors so as to minimize the overall variation. This can be done by regression techniques. Based on a collected data set, weight factors are determined that minimize the variation in their sum.

In addition to a threshold for the amount of variation of the test metric, a duration of a time window can be set. The variation of the test metric may then be determined over different time periods, such as a few minutes, or an hour.

The system can have a memory for storing baseline information, and/or weight factors and/or threshold for the amount of variation of the test metric for example in the form of a lookup table. The stored information either partly of entirely can be used in various stages of use.

The example above makes use of a test metric in the form of a sum of the square roots of the inverse of the sensed signal intensities. However, this is only one option. More generally, the approach is to create a test metric. This test metric may be based on a sum or a ratio or any other suitable combination of sensor signal intensities, and will depend on the nature of the sensor signal. However, the test metric will be based on a combination of distance metrics. Thus, the raw sensor signal is first converted to a distance metric (by taking the square root of the inverse, in the case of a PIR sensor), and the distance metrics are then combined for the multiple sensors to create the test metric. In the example above, the combination is a summation.

In order to determine if there are single or multiple occupants, it may be determined if the test metric remains sufficiently constant over time. This is a null hypothesis. If a single occupant is present, test metric sum is constant within known bounds of variation. In case of multiple persons being present, it is fair to assume they will not move all the time side-to-side, and as a consequence the test metric will vary by a greater amount over time.

A further feature which may be included is to use PIR sensors to detect breathing. This approach is disclosed in V. Hers et al., "New concept using Passive Infrared (PIR) technology for a contactless detection of breathing movement: a pilot study involving a cohort of 169 adult patients", J. Clin. Monit. Comput. (2013) 27:521-529.

If more people are present, it is likely that more than one breathing frequency will be observed. The range of frequencies that is monitored can be limited to typical breathing frequencies. In this case a further test can be to determine if the breathing spectrum is multi-modal (for multiple people present). The corresponding null hypothesis is that the spectrum is single modal. In principle, a single PIR sensor may be used to implement this additional functionality.

The additional advantage of observing breathing rates is that only living creatures are detected and that objects that are moved, or have breathing rates outside the spectrum of observation do not cause artifacts.

As mentioned above, the test metric avoids the need to provide calibrated sensors, in particular as accurate location is not needed. The sensors may however be calibrated, and this may improve the test metric computation. Since the sensed intensity does not perfectly follow the square relationship but in fact has other non-linearities, the signal processing can be adapted for this non-linear dependence. Similarly, the dependence on direction (viewing angle) can be compensated, as part of a calibration. For example, the plastic cover of the sensors can be modified to change the sensitivity with regard to the sensor coverage.

Many types of PIR sensor have a threshold against which the measured intensity is tested, and an ON or OFF event is issued when the measured intensity passes the threshold. Such devices do not provide an analogue signal output. Intensity levels may however be measured using such sensors, as are required to form the test metric, for example by varying the detection threshold and observing when the PIR is triggered. The threshold at which triggering starts to happen, or the identification of two (closely spaced) threshold levels on either side of the trigger level, provides an estimate of the intensity.

In the above analysis, the reference intensity $I_0$ has been assumed to be constant, for ease of explanation. This assumption is correct if the sensor uses its own radiation source and is measuring reflection, and assuming calibrated radiation source and sensor as well as uniform reflection properties of the irradiated objects. Examples of such sensors are given below and can e.g. radar or ultrasound sensors. PIR sensors are passive and measure the radiation power emitted by the object(s) in the environment. This means that $I_0$ is not fully constant, but varies with the radiation strength of the (present) person. Preferably, the sensors in the room are calibrated such that their value of $I_0$ is however equal for a given radiation source.

A person also does not emit radiation uniformly. Clothes may absorb, and faces may radiate more strongly. Body temperature and size may also affect the overall strength. The system may account for the corresponding variation for example when the user turns around, or when there is absorbing furniture between the source and sensor. When there are sensors at multiple locations in the room, a better coverage is realized so that the sum over all sensors, as described above, is less sensitive to a non-uniform radiation pattern.

Given the radiation power per person, the presence of multiple persons is also detectable by the total level of radiation. In particular, when a person enters or leaves the room (the viewing area) a sudden change in the total level can be detected, which can also be used to estimate the number of people present, in addition to the simple detection of multiple occupants.

This changes the total level of the sense signal, but this total level is shown above to vary in any case even with movement of a single person. However, users entering or exiting a space appear as a sudden change (sudden relative to speed of change when walking around). Therefore, it is possible to monitor both the variation in total intensity and the variation in the test metric (the sum of inverted intensities), to detect changes in either of them. The outcomes may be combined to make a more robust determination of multiple occupants.

The invention is described above based on PIR sensors. However, other sensors can also be used. In particular radiation sensors are suitable as they can sense without contact i.e. from a distance. Examples include electromagnetic radiation sensors (such as e.g. radar). Other sensors include sound sensors such as e.g. ultrasound sensors.

The signal processing to derive a distance metric and then to derive the ideally constant test metric will then vary in dependence on the sensor modality used to generate the sensor signals. Radar and ultrasound sensors can be based on measurement of the returned energy, so that the inverse square law again applies (but based on double the distance for the outward and return paths). However, time of time-of-flight approaches may instead be used. In this case, a pulse is emitted or a chirp signal, and the duration before the return pulse, or a correlation with the returned chirp (to find the delay at which correlation is maximum), is measured. The time of flight is then multiplied with the propagation velocity to obtain the (double) distance.

Figure 4:
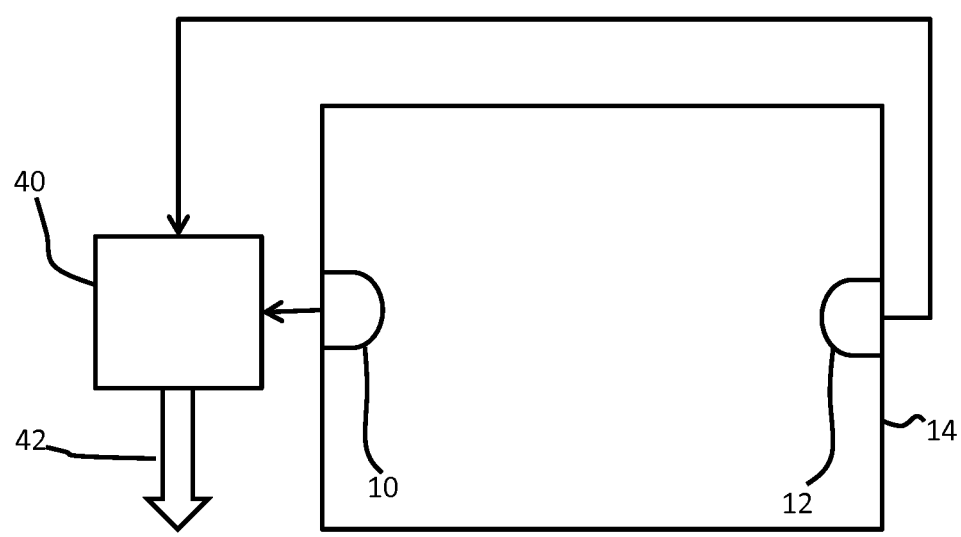
FIG. 4 shows an example of the occupancy sensing system.

FIG. 4 shows an example of the system, in which the output from two sensors 10, 12 are provided to a controller 40 which processes the sensor signals in the manner explained above, to derive an output 42 which indicates if there is a single or multiple occupant. This information may then be used by an Activities of Daily Living (ADLs) system to assist in the interpretation of sensor data, for example to enable isolation of the activities of a patient or subject being monitored from other carers or guests visiting the patient or subject.

The method is implemented by software in the controller.

Figure 5:
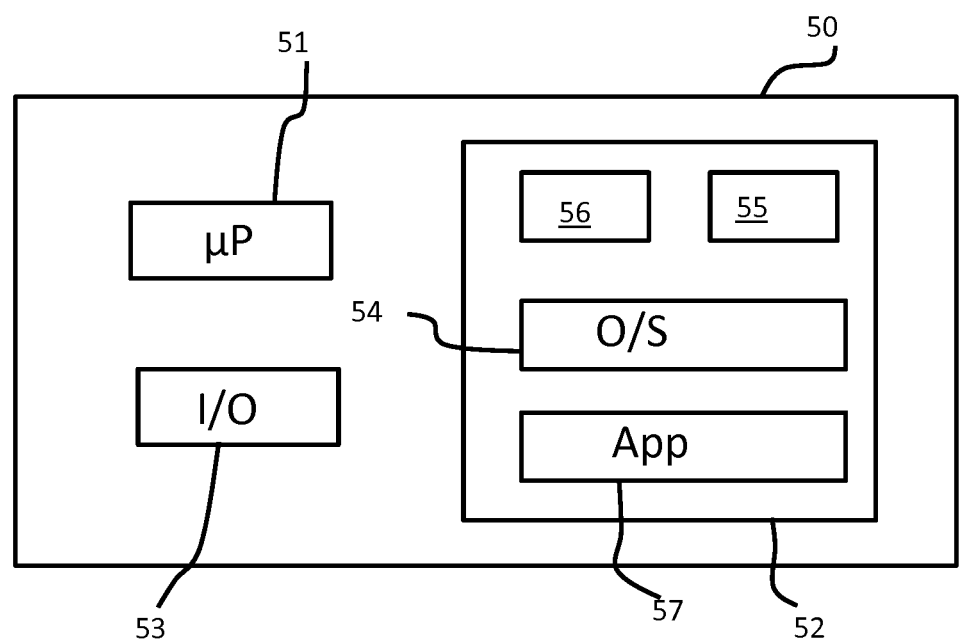
FIG. 5 shows an example of a computer for implementing a method used by the system of FIG. 4.

FIG. 5 illustrates an example of a computer 50 for implementing the controller or processor described above.

The computer 50 includes, but is not limited to, PCs, workstations, laptops, PDAs, palm devices, servers, storages, and the like. Generally, in terms of hardware architecture, the computer 50 may include one or more processors 51, memory 52, and one or more I/O devices 53 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 51 is a hardware device for executing software that can be stored in the memory 52. Alternatively the software may run remotely on another processor. The processor 51 can be virtually any custom made or commercially available processor, a dedicated local device processor, a central processing unit (CPU), a digital signal processor (DSP), or an auxiliary processor among several processors associated with the computer 50, and the processor 51 may be a semiconductor based microprocessor (in the form of a microchip) or a microprocessor.

The memory 52 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 52 may incorporate electronic, magnetic, optical, and/or other types of storage media. Note that the memory 52 can have a distributed architecture, where various components are situated remote from one another, but can be accessed by the processor 51.

The software in the memory 52 may include one or more separate programs, each of which comprises an ordered listing of executable instructions for implementing logical functions. The software in the memory 52 includes a suitable operating system (O/S) 54, compiler 55, source code 56, and one or more applications 57 in accordance with exemplary embodiments.

The application 57 comprises numerous functional components such as computational units, logic, functional units, processes, operations, virtual entities, and/or modules.

The operating system 54 controls the execution of computer programs, and provides scheduling, input-output control, file and data management, memory management, and communication control and related services.

Application 57 may be a source program, executable program (object code), script, or any other entity comprising a set of instructions to be performed. When a source program, then the program is usually translated via a compiler (such as the compiler 55), assembler, interpreter, or the like, which may or may not be included within the memory 52, so as to operate properly in connection with the operating system 54. Furthermore, the application 57 can be written as an object oriented programming language, which has classes of data and methods, or a procedure programming language, which has routines, subroutines, and/or functions, for example but not limited to, C, C++, C #, Pascal, BASIC, API calls, HTML, XHTML, XML, ASP scripts, JavaScript, FORTRAN, COBOL, Perl, Java, ADA, .NET, and the like.

The I/O devices 53 may include input devices such as, for example but not limited to, a mouse, keyboard, scanner, microphone, camera, etc. Furthermore, the I/O devices 53 may also include output devices, for example but not limited to a printer, display, etc. Finally, the I/O devices 53 may further include devices that communicate both inputs and outputs, for instance but not limited to, a network interface controller (NIC) or modulator/demodulator (for accessing remote devices, other files, devices, systems, or a network), a radio frequency (RF) or other transceiver, a telephonic interface, a bridge, a router, etc. The I/O devices 53 also include components for communicating over various networks, such as the Internet or intranet.

When the computer 50 is in operation, the processor 51 is configured to execute software stored within the memory 52, to communicate data to and from the memory 52, and to generally control operations of the computer 50 pursuant to the software. The application 57 and the operating system 54 are read, in whole or in part, by the processor 51, perhaps buffered within the processor 51, and then executed.

When the application 57 is implemented in software it should be noted that the application 57 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An occupancy detection system, comprising:
   at least two sensors mounted spaced apart to monitor an area in which occupancy detection is to be carried out, each sensor of the at least two sensors being configured for generating (i) a sensor signal when in a static mode in which the sensor has a static field of view covering at least a part of the area, wherein the sensor signal is dependent on a distance from the sensor to one or more sensed subjects present in the area, and (ii) a sensor output based on the sensor signal, the sensor output comprising distance data of the one or more subjects to the sensor; and
   a processor for processing received sensor outputs from the at least two sensors,
   wherein the processor is adapted to:
   derive a test metric based on a combination of the sensor outputs, wherein the test metric represents a combination of the distances of the at least two sensors to the one or more sensed subjects present in the area; and
   determine from an evolution of the test metric over time whether there is a single subject or multiple subjects present in the area.

2. The system as claimed in claim 1, wherein one or more of the sensor outputs comprises, or consists of the outputs of one or more of the following sensors: a radiation sensor, an active radiation sensor, a passive radiation sensor, a passive infrared (PIR) sensor.

3. The system as claimed in claim 1 wherein the processor is adapted to obtain a distance metric from the sensor signal intensity or the inverse of the sensor signal intensity, wherein the test metric comprises a combination of the distance metrics.

4. The system as claimed in claim 1, wherein the processor is further adapted to set a threshold for the variation in the test metric from a baseline level, wherein a deviation of the test metric beyond the threshold is indicative of multiple subjects present in the area, and to set a time window over which the threshold is applied.

5. The system as claimed in claim 4, wherein the threshold comprises a predetermined number of standard deviations of the test metric for a single subject present in the area.

6. The system as claimed in claim 1, further comprising said at least two sensors mounted spaced apart in the area.

7. The system as claimed in claim 1, wherein the system is further adapted to:
   detect single or multiple breathing frequencies based on the sensor signals related to respiratory breathing of the one or more sensed subjects, the one or more sensed subjects being a living creature having a specified breathing frequency range or a breathing spectrum; or
   detect total thermal radiation levels from the sensor signals, and thereby detect the single or the multiple subjects to be present in the area.

8. The system as claimed in claim 1, wherein the evolution of the test metric over time is based on a time series of the test metric, wherein analyzing the time series indicates a single subject is present when the test metric varying in a first predictable way, and multiple subjects are present when the test metric varying differently from the first predictable way.

9. The system as claimed in claim 1, wherein the test metric is function of:

a ratio of intensities of the sensor signals from the at least two sensors, and the distance of a subject to a sensor;

a sum of the square roots of the intensities of the sensor signals from the at least two sensors, and the distance of a subject to a sensor; or a sum of the square root of the inverse intensities of the sensor signals from the at least two sensors, and the distance of a subject to a sensor.

10. A method of detecting the presence of one or more subjects in an area, comprising:

receiving sensor outputs from at least two sensors mounted spaced apart in or near an area, each sensor being configured, when in a static mode in which a sensor has a static field of view concerning at least a part of the area in which the occupancy detection is to be carried out, for generating a sensor signal which is dependent on distances of the sensor to one or more sensed subjects present in the area and for generating a sensor output based on the sensor signal, wherein the sensor output comprises distance data of one or more subjects to the sensor;

deriving a test metric based on a combination of the sensor outputs, wherein the test metric represents a combination of the distances of the at least two sensors to the one or more sensed subject resent in the area; and determining from an evolution of the test metric over time whether there is a single subject or whether there are multiple subjects in the area.

11. The method as claimed in claim 10, comprising:

providing the at least two sensors to generate the sensor outputs, mounting the at least two sensors spaced apart in the area and transmitting the sensor outputs to the processor.

12. The method as claimed in claim 10, wherein each sensor comprises, or consists of one or more of the following: a radiation sensor, an active radiation sensor, a passive radiation sensor, a passive infrared (PIR) sensor.

13. The method as claimed in claim 10, further comprising: obtaining a distance metric from the sensor signal intensity or the inverse of the sensor signal intensity, wherein the test metric for example comprises a combination of the distance metrics.

14. The method as claimed in claim 10, further comprising: setting a threshold for the variation in the test metric from a baseline level, wherein a deviation of the test metric beyond the threshold is indicative of multiple subjects present in the area, and optionally to setting a time window over which the threshold is applied.

15. The method as claimed in claim 14, wherein the threshold comprises a predetermined number of standard deviations of the test metric for a single occupant.

16. The method as claimed in claim 10, further comprising:

determining single or multiple breathing frequencies based on the sensor signals related to respiratory breathing of the one or more sensed subjects, the one or more sensed subjects being a living creature having a specified breathing frequency range or a breathing spectrum; and/or determining thermal radiation levels within the area, and thereby detect single or multiple subjects to be present in the area.

17. A non-transitory computer-readable media comprising instructions, the computer-readable media when executed by one or more processors, cause operations comprising the steps of the method of claim 10.

* * * * *